US012313165B2

(12) United States Patent
Lory et al.

(10) Patent No.: US 12,313,165 B2
(45) Date of Patent: May 27, 2025

(54) BUTTERFLY VALVE ASSEMBLY, IN PARTICULAR FOR A GAS FLOW IN A FUEL CELL SYSTEM (71) Applicant: Purem GmbH, Neunkirchen (DE)

(72) Inventors: Markus Lory, Stuttgart (DE); Matthias Grün, Altbach (DE); Andreas Wacker, Plochingen (DE); Jochen Hammer, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 11 days.

(21) Appl. No.: 18/447,663

(22) Filed: Aug. 10, 2023

(65) Prior Publication Data
US 2024/0052929 A1 Feb. 15, 2024

(30) Foreign Application Priority Data

Aug. 11, 2022 (DE) ...................... 10 2022 120 288.7
Jul. 5, 2023 (EP) ...................... 23183541

(51) Int. Cl.
*F16K 1/22* (2006.01)
*F16K 1/226* (2006.01)
(Continued)

(52) U.S. Cl.
CPC ............ *F16K 1/224* (2013.01); *F16K 1/2268* (2013.01); *F16K 27/0218* (2013.01);
(Continued)

(58) Field of Classification Search
CPC .... F16K 1/224; F16K 1/2268; F16K 27/0218; H01M 8/04201; H01M 8/04089; H01M 2250/20
(Continued)

(56) References Cited

U.S. PATENT DOCUMENTS 3,778,028 A * 12/1973 Graves .................. F16K 1/2265
251/306
5,314,165 A * 5/1994 Raymond, Jr. ....... F16K 1/2265
251/305
(Continued)

FOREIGN PATENT DOCUMENTS

DE       11 77 433 B     9/1964
DE       27 33 606 A1    2/1979
(Continued)

OTHER PUBLICATIONS

English translation of Office Action of the Korean Patent Office dated Nov. 12, 2024 in corresponding Korean application 10-2023-0104900.

Primary Examiner — John Bastianelli
(74) Attorney, Agent, or Firm — Walter Ottesen, P.A.

(57) ABSTRACT

A butterfly valve assembly includes a butterfly valve housing which provides a gas flow channel and a butterfly valve adjustable in the butterfly valve housing between a closed position and an open position for a passage of flow. The butterfly valve assembly has a disk-shaped butterfly valve element supported on a pivot shaft rotatable about a pivot shaft axis. The pivot shaft has a first pivot shaft end portion provided for coupling to a pivot shaft drive, and in a first bearing region being supported rotatably about the pivot shaft axis on the housing, and a second pivot shaft end portion, in a second bearing region being supported rotatably about the pivot shaft axis on the housing. At least one bearing region includes a bearing unit rotatably supporting the pivot shaft. A seal is supported in the bearing unit and lies against an outer peripheral surface of the pivot shaft.

13 Claims, 5 Drawing Sheets (51) Int. Cl.
  *F16K 27/02* (2006.01)
  *H01M 8/04082* (2016.01)
  *H01M 8/04089* (2016.01)

(52) U.S. Cl.
  CPC .... *H01M 8/04201* (2013.01); *H01M 8/04089* (2013.01); *H01M 2250/20* (2013.01)

(58) Field of Classification Search
  USPC .......................................... 251/305–308, 214
  See application file for complete search history.

(56) References Cited

U.S. PATENT DOCUMENTS

| | | | |
|---|---|---|---|
| 6,595,488 B2 * | 7/2003 | Zwick | F16K 1/224 |
| | | | 251/308 |
| 7,582,372 B2 * | 9/2009 | Ichikawa | H01M 8/04089 |
| | | | 137/154 |
| 2015/0303498 A1 * | 10/2015 | Nakamura | H01M 8/04097 |
| | | | 137/340 |
| 2016/0047481 A1 * | 2/2016 | Park | F16K 31/53 |
| | | | 137/312 |
| 2017/0342914 A1 | 11/2017 | Noumura et al. | |
| 2018/0238454 A1 | 8/2018 | Hasegawa | |
| 2019/0264816 A1 | 8/2019 | Bartolotta et al. | |

FOREIGN PATENT DOCUMENTS

| | | |
|---|---|---|
| DE | 11 2005 001 467 B4 | 4/2015 |
| DE | 11 2014 007 122 T5 | 7/2017 |
| DE | 11 2015 005 799 T5 | 9/2017 |
| EP | 3 533 981 A1 | 9/2019 |
| JP | 2009-299879 A | 12/2009 |

\* cited by examiner

BUTTERFLY VALVE ASSEMBLY, IN PARTICULAR FOR A GAS FLOW IN A FUEL CELL SYSTEM

CROSS-REFERENCE TO RELATED APPLICATIONS

This application claims priority of German patent application no. 10 2022 120 288.7, filed Aug. 11, 2022, and European patent application no. 23 183 541.4, filed Jul. 5, 2023, the entire contents of which are incorporated herein by reference.

TECHNICAL FIELD

The present disclosure relates to a butterfly valve assembly that can be used for example for a gas flow in a fuel cell system, in particular in a vehicle, for the purposes of providing electrical energy.

BACKGROUND

In such fuel cell systems, depending on the operating state, it is necessary to conduct different gas flows through or past the anode region, and through or past the cathode region, of a fuel cell or of a fuel cell stack. Here, stringent demands are placed on the leak-tightness of butterfly valve assemblies used to regulate such gas flows, in order to ensure, in particular in operating states in which a particular gas flow should not be conducted through a fuel cell or should not be conducted past a fuel cell, that leakage flows can be ruled out and substantially no gas can escape to the surroundings.

SUMMARY

It is an object of the present disclosure to provide a butterfly valve assembly, in particular for a gas flow in a fuel cell system, in particular in a vehicle, which butterfly valve assembly can substantially prevent gas leakage while being of structurally simple configuration.

The object is, for example, achieved according to the disclosure via a butterfly valve assembly, in particular for a gas flow in a fuel cell system, in particular in a vehicle, including a butterfly valve housing which provides a gas flow channel, a butterfly valve which is adjustable in the butterfly valve housing between a closed position, substantially preventing a gas flow through the gas flow channel, and at least one open position, opening up the gas flow channel for a passage of flow, and which has a disk-shaped butterfly valve element supported on a pivot shaft which is rotatable about a pivot shaft axis, the pivot shaft having a first pivot shaft end portion, which is provided for coupling to a pivot shaft drive and which in a first bearing region is supported rotatably about the pivot shaft axis on the butterfly valve housing, and a second pivot shaft end portion, which in a second bearing region is supported rotatably about the pivot shaft axis on the butterfly valve housing, at least one bearing region out of the first bearing region and second bearing region including a bearing unit, which rotatably supports the pivot shaft, and at least one sealing element, which is supported in the bearing unit and which lies against an outer circumferential surface of the pivot shaft.

Through the provision of the at least one sealing element that lies against the outer circumferential surface of the pivot shaft, it is ensured that, even if bearing play arises in the region of the at least one bearing unit, tight closure of the butterfly valve assembly that prevents an escape of gas is achieved.

Since the first pivot shaft end portion of the pivot shaft has to be led through the associated first bearing region in order to enable coupling to the pivot shaft drive, it is particularly conducive to gas-tight closure if the at least one bearing region is the first bearing region. In the second bearing region, in which the pivot shaft does not need to be led with its second pivot shaft axis through the bearing region or out of the bearing region, a gas-tight closure can be implemented by other measures, for example complete encapsulation of the second pivot shaft end portion via a bearing bushing.

To achieve a completely gas-tight connection of the at least one sealing element to the pivot shaft over the entire circumference of the pivot shaft, it is proposed that the at least one sealing element annularly surrounds the pivot shaft axis, and/or that the bearing unit annularly surrounds the pivot shaft axis.

In order to be able to firstly ensure stable positioning of the sealing element in the structural material of the bearing unit, and secondly ensure interaction with the pivot shaft that leads to adequate sealing, the at least one sealing element may include a holding portion, which is encompassed by a structural material of the bearing unit, and a sealing portion, which lies against the pivot shaft.

The bearing unit may for example include at least one bearing ring, and the holding portion of the at least one sealing element may be embedded into the structural material of a bearing ring. For example, the holding portion may be insert-molded, for example encapsulated, in the structural material during the production of the bearing ring.

In an alternative embodiment, the bearing unit may include at least two bearing rings, and the holding portion of the at least one sealing element may be held between two bearing rings. This allows a structurally very simple embodiment, with nevertheless defined positioning of the at least one sealing element between the two bearing rings.

In order to be able to configure the sealing portion in particular to have relatively large dimensions, and thus in order to be able to provide high flexibility of the sealing portion, it is proposed that the holding portion extends substantially axially in the structural material of the bearing unit, and that the sealing portion extends radially inward from the holding portion toward the pivot shaft. In this embodiment, the at least one sealing element is substantially pot-shaped, with a circumferential wall that substantially includes the holding portion, and with an opening in a base that substantially includes the sealing portion, the opening receiving the pivot shaft.

For example, the sealing portion may in this case extend radially inward, and in a direction away from the bearing unit, toward the pivot shaft.

In an alternative embodiment, the holding portion may extend substantially radially in the structural material of the bearing unit, and the sealing portion may extend radially inward from the holding portion toward the pivot shaft. In this embodiment, the at least one sealing element is substantially in the shape of an annular disk.

In order for the pivot shaft and the bearing unit to be held stably on the butterfly valve housing, it is proposed that the at least one bearing region includes a bearing bushing which is supported on the butterfly valve housing, and that the bearing unit is held in the bearing bushing via an interference fit and/or the pivot shaft.

In an embodiment which is of particularly simple construction and requires little maintenance, the bearing unit may be a plain bearing unit.

In order to achieve adequate flexibility in the region of the at least one sealing element, the latter may be constructed with elastomer material.

The disclosure furthermore relates to a fuel cell system, in particular for a vehicle, including at least one butterfly valve assembly constructed in accordance with the disclosure.

BRIEF DESCRIPTION OF DRAWINGS

The invention will now be described with reference to the drawings wherein.

DETAILED DESCRIPTION

Before the embodiment according to the disclosure of a butterfly valve assembly for a fuel cell system is described in detail below, in particular with regard to a structure thereof which is intended for providing a sealed closure, the basic construction of a fuel cell system which can be used to provide electrical energy in a vehicle will be described with reference to FIG. 1, and the basic construction of a butterfly valve assembly which, in particular when assigned to the cathode region of such a fuel cell system, can be used to regulate the gas flow or shut off a flow through the cathode region, will be discussed with reference to FIG. 2.

Figure 1:
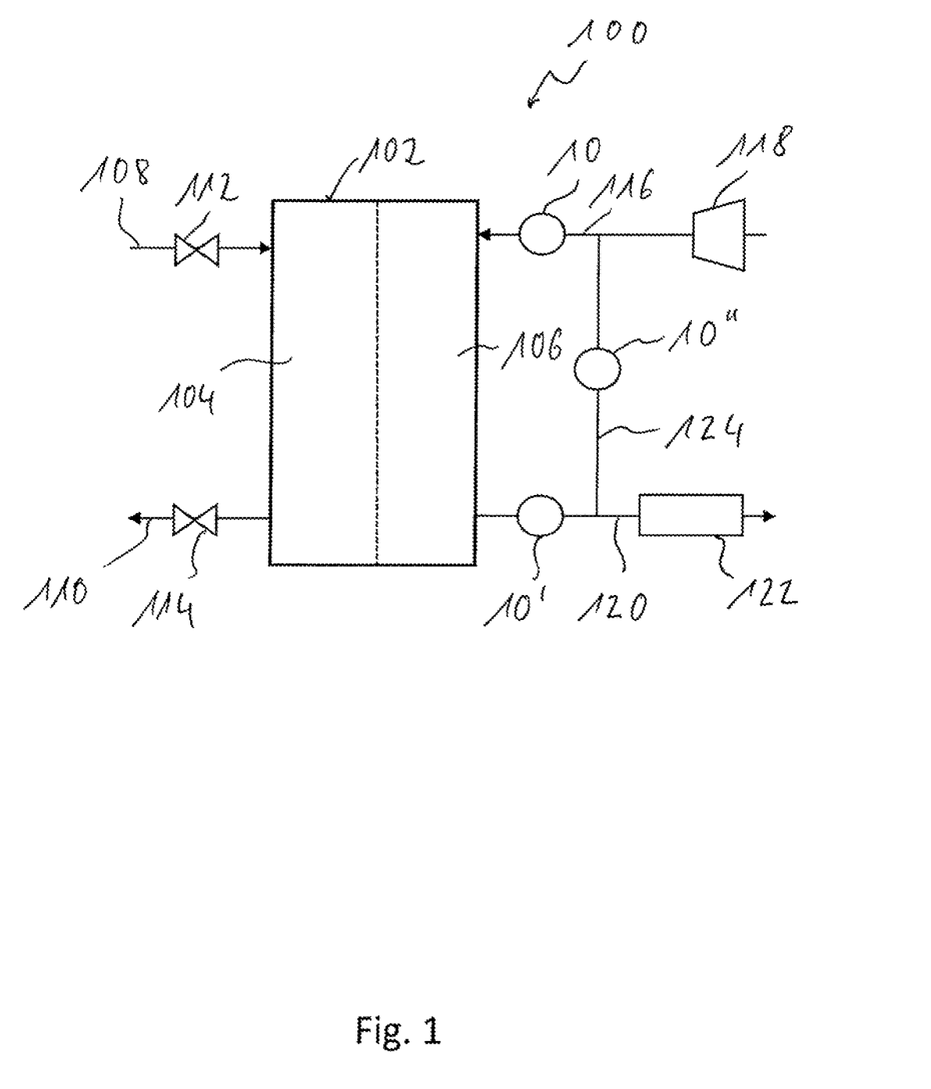
FIG. 1 shows a schematic diagram of a fuel cell system of a vehicle.

The fuel cell system 100 illustrated in FIG. 1 includes, as a main system region, a fuel cell denoted generally by 102, having an anode region 104, which is to be fed with hydrogen or with a gas containing hydrogen, and having a cathode region 106, which is to be fed with oxygen or with a gas containing oxygen, for example air.

The anode region 104 is assigned a feed line 108 and a discharge line 110 with respective valves 112, 114 in order to allow the hydrogen or the gas containing hydrogen to be introduced into the anode region 104 and/or to allow anode off-gas to be discharged therefrom, and if necessary to allow the anode region 104 to be closed off entirely.

The cathode region 106 is assigned a feed line 116 via which the gas containing oxygen, for example air, can be introduced into the cathode region, for example via a compressor 118 or the like. A butterfly valve assembly denoted generally by 10 is provided in the feed line 116, via which butterfly valve assembly the gas flow via the feed line 116 can be regulated, or the cathode region 106 can be substantially gas-tightly closed off in its inlet region.

For the discharge of cathode off-gas, the cathode region 106 is assigned a discharge line 120. This leads to a fuel cell off-gas system 122 in which, for example, water contained in the cathode off-gas can be separated off using a water separator. Also arranged in the discharge line 120 is a further butterfly valve assembly 10' via which the discharge line 120 and thus outlet region of the cathode region 106 can be substantially gas-tightly closed off.

A bypass line 124 runs between the feed line 116 and the discharge line 120 of the cathode region 106. A butterfly valve assembly 10" is also arranged in the bypass line 124, via which butterfly valve assembly the gas flow via the bypass line 124 can be regulated or the bypass line 124 can be substantially gas-tightly closed off.

The construction of the fuel cell system 100 as illustrated in FIG. 1 and described above represents one example out of numerous different possibilities for the feed and discharge of gas, in particular at the cathode region 106. It is essential that at least one and optionally several butterfly valve assemblies 10, 10', 10" are provided so as to be assigned to the cathode region 106, wherein, if several such butterfly valve assemblies 10, 10', 10" are provided, these may in principle be structurally identical to one another, or may also be of different configuration depending on the region in which they are positioned and what degree of gas-tightness they are intended to provide.

Figure 2:
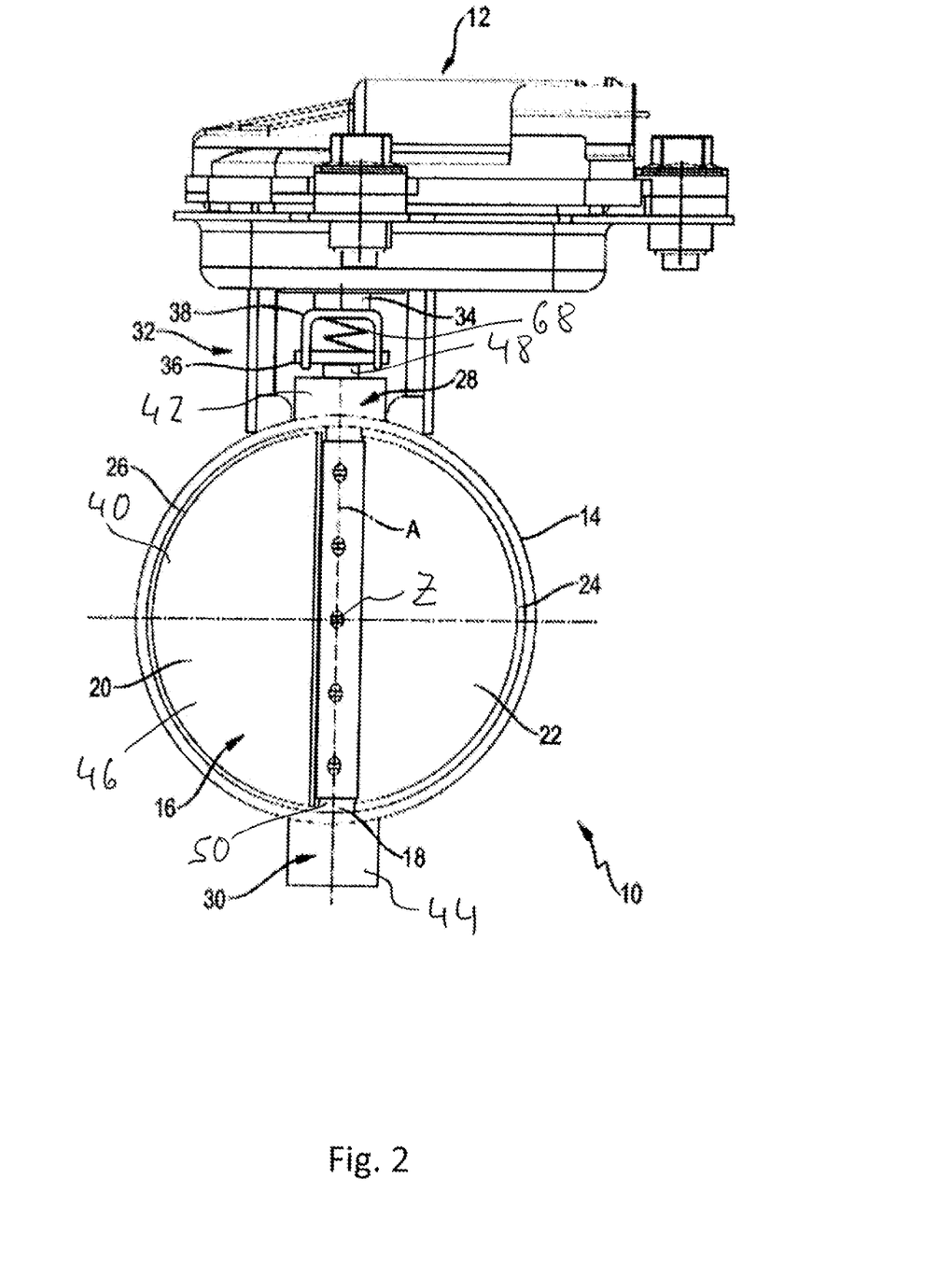
FIG. 2 shows a butterfly valve assembly for a fuel cell system.

The butterfly valve assembly 10 illustrated in FIG. 2 and used for example in the fuel cell system 100 of FIG. 1 includes a butterfly valve drive 12 based for example on an electric motor and includes, in a butterfly valve housing 14 which is tubular and bounds a gas flow channel 46, a butterfly valve denoted generally by 16.

The butterfly valve 16 includes a disk-shaped butterfly valve element 24 which is supported so as to be pivotable about a pivot shaft 18 axis A and which has two butterfly valve element parts 20, 22, which each provide one valve wing. A butterfly valve seat 26 is provided on the butterfly valve housing 14 so as to be assigned to the butterfly valve 16, against which butterfly valve seat the butterfly valve 16 lies, when in a closed position, by way of a closure region 40 which is situated radially at the outside in relation to a central region Z of the butterfly valve 16.

To move the butterfly valve 16 between the closed position and a fully opened position, in which the disk-shaped butterfly valve element 24 is oriented substantially orthogonally with respect to the plane of the drawing and FIG. 1 and thus substantially completely opens up the gas flow channel 46 in the butterfly valve housing 14 for a passage of flow, a drive shaft 34 of the butterfly valve drive 12 is coupled rotationally conjointly to the pivot shaft 18, which is supported in bearing regions 28, 30 on the butterfly valve housing 14 so as to be pivotable about the pivot shaft axis A, via a coupling arrangement 32. Here, the coupling arrangement 32 includes for example a coupling part 38, which is connected rotationally conjointly to the drive shaft 34, and a coupling part 36, which is connected rotationally conjointly to the pivot shaft 18 and which engages with the coupling part 38 with rotational coupling action.

Each of the two bearing regions 28, 30 includes a bearing bushing 42, 44, which is supported on the butterfly valve housing 14 and which is for example fixed to an outer circumferential surface thereof by welding and in which a respective axial end portion of the pivot shaft 18 is received so as to be rotatable about the pivot shaft axis A.

Of the two bearing regions 28, 30, the bearing region 28 forms a first bearing region in which a first pivot shaft end portion 48 of the pivot shaft 18 is rotatably mounted. The first pivot shaft end portion 48 projects axially beyond the first bearing region 28 in order to be coupled via the coupling arrangement 32 to the drive shaft 34. The bearing region 30 forms a second bearing region in which a second pivot shaft end portion 50 of the pivot shaft 18 is mounted so as to be rotatable about the pivot shaft axis A.

Figure 3:
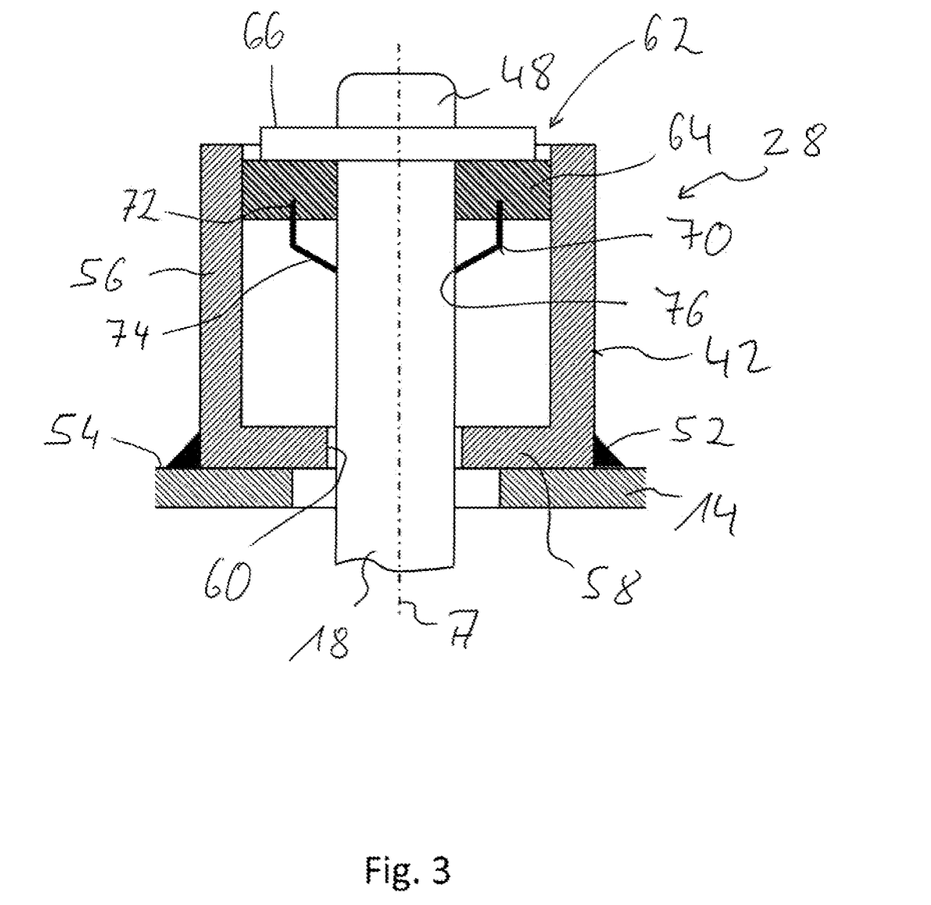
FIG. 3 shows a sectional view of a bearing region for a pivot shaft of the butterfly valve assembly.

FIG. 3 illustrates the first bearing region 28 in detail. The first bearing region 28 includes the bearing bushing 42, which is, for example, fixed gas-tightly to the outer circumferential surface 54 of the butterfly valve housing 14 by a fully encircling weld seam 52. The bearing bushing 42 includes a circumferential wall 56 and a base 58 which adjoins the circumferential wall and which has an opening 60 through which the pivot shaft 18 extends. The bearing bushing 42 may also have only the circumferential wall 56 and no base wall, which, in particular in the case of the domed contour of the outer circumferential surface 54 of the butterfly valve housing 14, allows the bearing bushing 42 to be more easily fixed to the butterfly valve housing 14, also allows a configuration of the bearing bushing 42 which is easier to produce.

A bearing unit denoted generally by 62 is received in the bearing bushing 42. In the embodiment illustrated, the bearing unit 62 includes a bearing ring 64 which receives and radially supports the first pivot shaft end portion 48, and is thus configured as a plain bearing unit. The bearing ring 64 may be received in the bearing bushing 42 for example with an interference fit, and thus held in a defined axial position on the circumferential wall 56 of the bearing bushing 42. The pivot shaft 18 may be supported axially on the bearing ring 64 by way of a flange-like pivot shaft head 66 which is provided on the first pivot shaft end portion 48. A preload force that holds the pivot shaft head 66 of the pivot shaft 18 in contact with the bearing ring 64 may be provided by a preload spring 68 which acts between the pivot shaft 18 or the coupling part 36, on the one hand, and the drive shaft 34 or the coupling part 38, on the other hand, such that the defined position of the bearing ring 64 in the bearing bushing 42 also determines a defined position of the pivot shaft 18, and thus of the butterfly valve 16 as a whole, in the butterfly valve housing 14.

A sealing element denoted generally by 70 is supported on the bearing ring 64 of the bearing unit 62. The sealing element 70 has a holding portion 72 which is embedded into the structural material of the bearing ring 64, which extends approximately in the direction of the pivot shaft axis A and is thus substantially cylindrical, and which projects axially out of the bearing ring 64 or the structural material thereof at that end side of the bearing ring which faces toward the butterfly valve housing 14. A sealing portion 74 extends radially inward from the holding portion 72 of the sealing element 70 and in a direction away from the bearing ring 64. The sealing portion 74 thus has a substantially conical or frustoconical shape, and in a central region has an opening 76 through which the first pivot shaft end portion 48 extends. The opening is in principle dimensioned such that, when the pivot shaft 18 has not been led through the opening, the opening has a cross-sectional dimension smaller than a cross-sectional dimension of the pivot shaft 18, such that, when or after the pivot shaft 18 is or has been led through the opening 76, the sealing portion 74 of the sealing element 70 bears under preload against the outer circumferential surface of the pivot shaft 18. Owing firstly to the holding portion 72 being embedded into the structural material of the bearing ring 64, and owing secondly to the preloaded abutment of the sealing portion 74 against the pivot shaft 18, the sealing element 70 thus provides a completely gas-tight closure in the region of the first bearing region 28, through which the pivot shaft 18 is led in order to be coupled to the drive shaft 34.

The embedding of the sealing element 70, which is constructed for example with elastomer material, by way of its holding portion 72 into the structural material of the bearing ring 64 can be achieved by virtue of the sealing element 70, in the region of its holding portion 72, being at least regionally insert-molded, for example encapsulated, in the structural material of the bearing ring 64 during the production of the bearing ring 64. To achieve even more stable holding interaction here, it is for example possible for the sealing element 70 to be formed, in its holding portion 72, with a structured surface or a cross-sectional variation, for example a bead-like end region.

Figure 4:
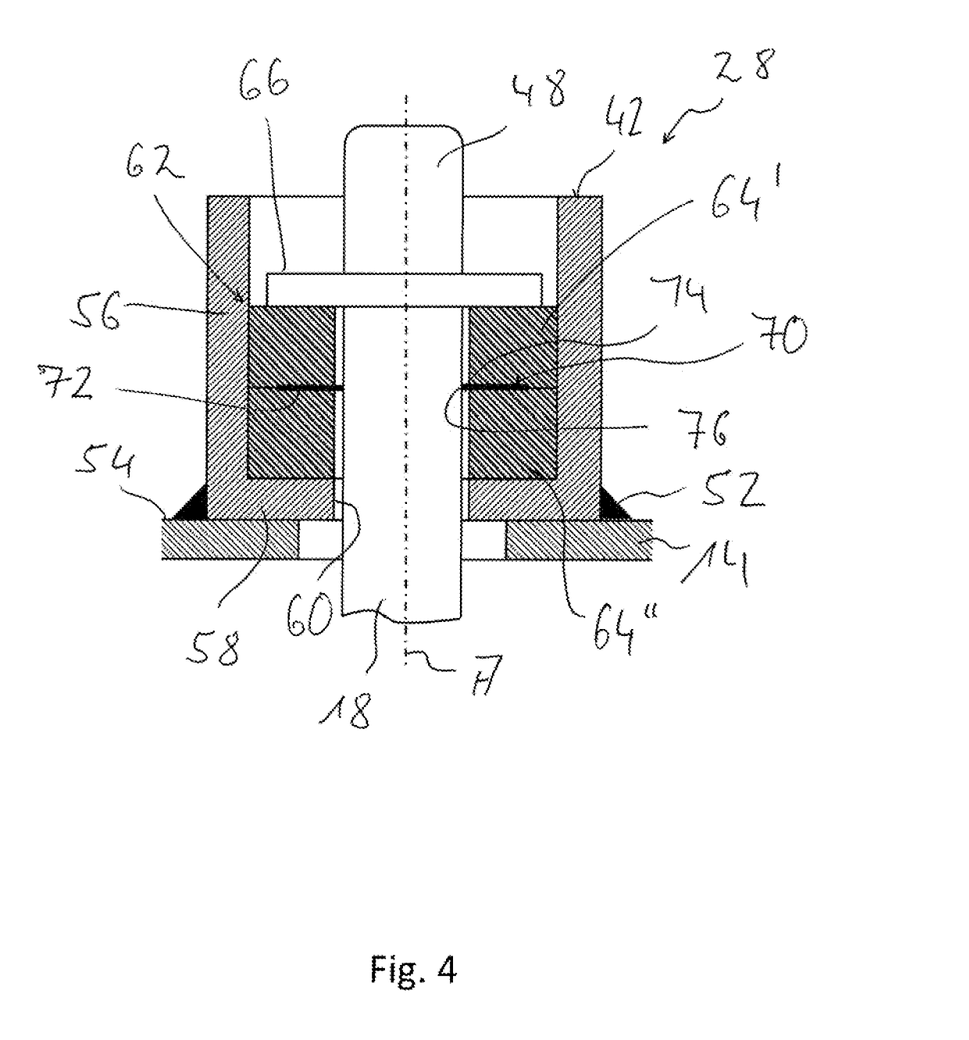
FIG. 4 shows a view, corresponding to FIG. 3, of an alternative embodiment; and, FIG. 5 shows a further view, corresponding to FIG. 3, of an alternative embodiment.

An alternative embodiment of the first bearing region 28 is illustrated in FIG. 4. In the embodiment illustrated in FIG. 4, the bearing unit 62, which also axially supports the pivot shaft 18 or the pivot shaft head 66 thereof, includes two bearing rings 64', 64". In the embodiment illustrated, the two bearing rings 64', 64" are arranged so as to axially adjoin one another, and the bearing ring 64" may be axially supported for example on the base 58 of the bearing bushing 42. In this embodiment, too, the two bearing rings 64', 64" may be received in the bearing bushing 42 with an interference fit. Alternatively or in addition, a holding action for the two bearing rings 64', 64" may be provided by the pivot shaft 18 that is preloaded axially toward the bearing rings, or by the pivot shaft head 66 of the pivot shaft.

The sealing element 70, which in this embodiment is of substantially disk-shaped form, is received between the two bearing rings 64, 64'. The holding portion 72 of the sealing element 70 is situated between the two bearing rings 64', 64", and the sealing portion 74 extends radially inward toward the outer circumferential surface of the pivot shaft 18. In this illustration, the bearing play between the pivot shaft 18 and the bearing rings 64', 64" is illustrated on an exaggerated scale in order to more clearly illustrate the construction of the sealing element 70 and its interaction with the pivot shaft 18.

In order that a defined radial position of the sealing element 70 can be ensured in this embodiment, too, a cutout corresponding to the size and the shape of the sealing element 70 may be formed in at least one of the two bearing rings 64', 64" in that end side which is to be positioned facing the other bearing ring in each case, such that the sealing element 70 can be held between the two bearing rings 64', 64" substantially without axial preload or with only low axial preload even when acted on axially for example by the pivot shaft 18, and can in particular also be encompassed at its outer circumference by the structural material of at least one of the two bearing rings 64', 64".

Figure 5:
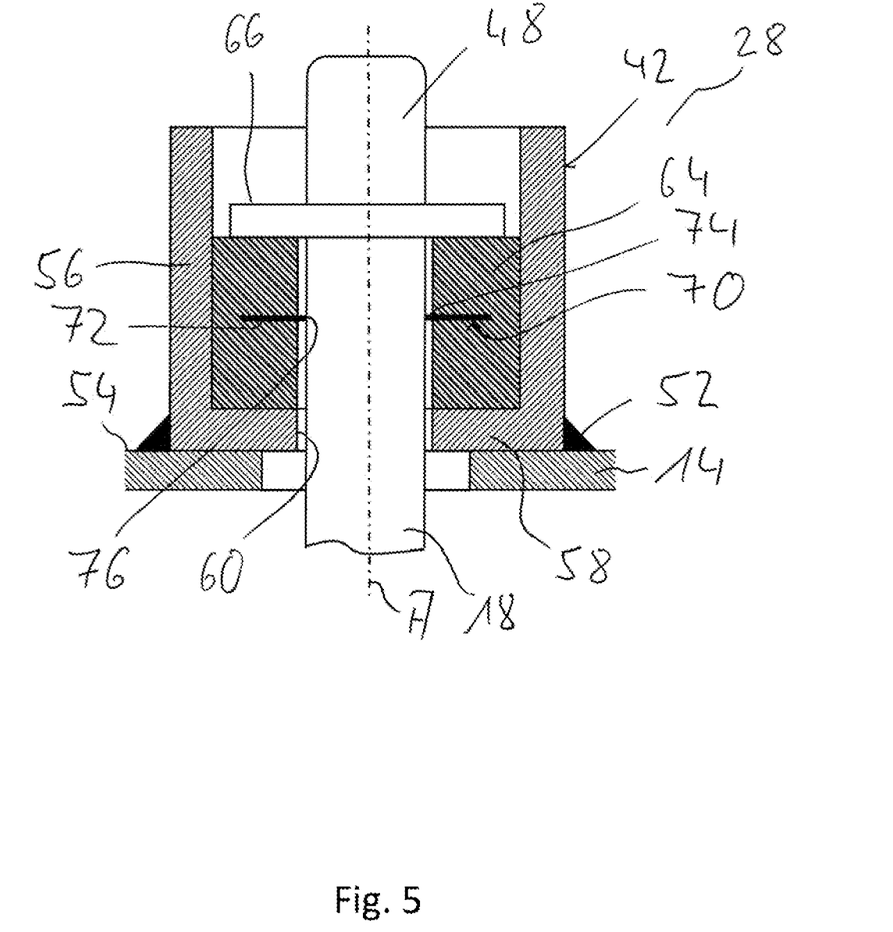

A further alternative embodiment of the first bearing region 28 is illustrated in FIG. 5. This embodiment combines the configuration concepts of the embodiments illustrated in FIGS. 3 and 4. The sealing element 70 is in the shape of an annular disk and is embedded by way of its holding portion 72 into the structural material of the single bearing ring 64 of the bearing unit 62. The sealing portion 74 projects radially inward in order to sealingly interact with the pivot shaft 18. In this embodiment, too, the holding portion 72 may be surrounded by the structural material of the sealing ring 64 by being insert-molded therein. Here, too, intensified holding interaction can be achieved for example by virtue of the surface of the holding portion 72 being structured and/or for example by virtue of a bead-like widened portion being formed on the outer circumference of the holding portion 72. With the present disclosure, it is made possible in a simple manner for the pivot shaft of the butterfly valve to be closed off, so as to prevent an escape of gas from the butterfly valve housing 14, in particular in that axial end portion in which the pivot shaft is to be coupled to the pivot shaft drive.

In principle, such a structure could also be provided in the second bearing region 30. Since it is however not intended for the pivot shaft 18 to be led out in the second bearing region 30, a gas-tight closure can for example also be achieved by virtue of the bearing bushing 44 of the second bearing region 30 completely encapsulating, that is, also axially encapsulating, the second pivot shaft end portion, for example by virtue of a cover which axially closes off the bearing bushing 44 being provided on a circumferential wall of the bearing bushing 44.

A butterfly valve assembly constructed in accordance with the disclosure may also be used in other applications, in particular also in the case of static fuel cell systems.

It is understood that the foregoing description is that of the preferred embodiments of the invention and that various changes and modifications may be made thereto without departing from the spirit and scope of the invention as defined in the appended claims.

The invention claimed is:

1. A butterfly valve assembly comprising:
a butterfly valve housing defining a channel for accommodating a flow of gas therethrough;
a butterfly valve adjustable in said butterfly valve housing between a closed position preventing said flow of gas through said channel and at least one open position opening up said channel for allowing passage of said flow of gas through said channel;
a pivot shaft rotatable about a pivot shaft axis (A) and having first and second pivot shaft end portions corresponding to first and second bearing regions, said pivot shaft having an outer peripheral surface;
said butterfly valve having a disk-shaped butterfly valve element supported on said pivot shaft;
a pivot shaft drive;
said first pivot shaft end portion being coupled to said pivot shaft drive and being rotatably supported about said pivot shaft axis (A) on said butterfly valve housing in said first bearing region;
said second pivot shaft end portion being rotatably supported about said pivot shaft axis (A) on said butterfly valve housing in said second bearing region;
at least one of said first and second bearing regions including a bearing unit made of structural material and rotatably supporting said pivot shaft and
at least one seal supported in said bearing unit and lying against said outer peripheral surface of said pivot shaft;
said at least one seal comprising a holding portion encompassed by said structural material and a sealing portion lying against said pivot shaft;
wherein one of the following applies:
i) said bearing unit comprises at least one bearing ring made of said structural material, said holding portion of said at least one seal being encompassed by said structural material by insert-molding said holding portion in said structural material and, thereby, embedding said holding portion into the structural material of said at least one bearing ring;
ii) said bearing unit comprises at least two bearing rings, said holding portion of said at least one seal being encompassed by said structural material by being held between said at least two bearing rings.

2. The butterfly valve assembly of claim 1, wherein said first bearing region includes said bearing unit rotatably supporting said pivot shaft.

3. The butterfly valve assembly of claim 1, wherein at least one of the following applies: i) said at least one seal annularly surrounds said pivot shaft axis (A); and, ii) said bearing unit annularly surrounds said pivot shaft axis (A).

4. The butterfly valve assembly of claim 1, wherein said holding portion extends axially into said structural material of said bearing unit; and, said sealing portion extends radially inward from said holding portion toward said pivot shaft.

5. The butterfly valve assembly of claim 4, wherein said sealing portion extends radially inward and in a direction away from said bearing unit toward said pivot shaft.

6. The butterfly valve assembly of claim 1, wherein said holding portion extends radially in said structural material of said bearing unit; and, said sealing portion extends radially inward from said holding portion toward said pivot shaft.

7. The butterfly valve assembly of claim 1, wherein said at least one of said first bearing region and second bearing region including said bearing unit rotatably supporting said pivot shaft further comprises a bearing bushing supported on said butterfly valve housing; and, said bearing unit is held in said bearing bushing by an interference fit and/or said pivot shaft.

8. The butterfly valve assembly of claim 1, wherein said bearing unit is a plain bearing unit.

9. The butterfly valve assembly of claim 1, wherein said at least one seal is made with elastomer material.

10. The butterfly valve assembly of claim 1, wherein said butterfly valve assembly is provided for the gas flow in a fuel cell system for a vehicle.

11. A fuel cell system for a vehicle, comprising:
at least one butterfly valve assembly including:
a butterfly valve housing defining a channel for accommodating a flow of gas therethrough;
a butterfly valve adjustable in said butterfly valve housing between a closed position preventing said flow of gas through said channel and at least one open position opening up said channel for allowing passage of said flow of gas through said channel;
a pivot shaft rotatable about a pivot shaft axis (A) and having first and second pivot shaft end portions corresponding to first and second bearing regions, said pivot shaft having an outer peripheral surface;
said butterfly valve having a disk-shaped butterfly valve element supported on said pivot shaft;
a pivot shaft drive;
said first pivot shaft end portion being coupled to said pivot shaft drive and being rotatably supported about said pivot shaft axis (A) on said butterfly valve housing in said first bearing region;
said second pivot shaft end portion being rotatably supported about said pivot shaft axis (A) on said butterfly valve housing in said second bearing region;
at least one of said first and second bearing regions including a bearing unit made of structural material and rotatably supporting said pivot shaft and
at least one seal supported in said bearing unit and lying against said outer peripheral surface of said pivot shaft;
said at least one seal comprising a holding portion encompassed by said structural material and a sealing portion lying against said pivot shaft;
wherein one of the following applies:
i) said bearing unit comprises at least one bearing ring made of said structural material, said holding portion of said at least one seal being encompassed by said structural material by insert-molding said holding portion in said structural material and, thereby, embedding said holding portion into the structural material of said at least one bearing ring;
ii) said bearing unit comprises at least two bearing rings, said holding portion of said at least one seal being encompassed by said structural material by being held between said at least two bearing rings.

12. A fuel cell system including for a vehicle, the fuel cell system comprising:
- an anode region to be supplied with hydrogen or a gas containing hydrogen;
- a cathode region to be supplied with oxygen or a gas containing oxygen;
- a butterfly valve assembly associated with said cathode region; and,
- said butterfly valve assembly including:
- a butterfly valve housing defining a channel for accommodating a flow of gas therethrough;
- a butterfly valve adjustable in said butterfly valve housing between a closed position preventing said flow of gas through said channel and at least one open position opening up said channel for allowing passage of said flow of gas through said channel;
- a pivot shaft rotatable about a pivot shaft axis (A) and having first and second pivot shaft end portions corresponding to first and second bearing regions, said pivot shaft having an outer peripheral surface;
- said butterfly valve having a disk-shaped butterfly valve element supported on said pivot shaft;
- a pivot shaft drive;
- said first pivot shaft end portion being coupled to said pivot shaft drive and being rotatably supported about said pivot shaft axis (A) on said butterfly valve housing in said first bearing region;
- said second pivot shaft end portion being rotatably supported about said pivot shaft axis (A) on said butterfly valve housing in said second bearing region;
- at least one of said first and second bearing regions including a bearing unit made of structural material and rotatably supporting said pivot shaft and
- at least one seal supported in said bearing unit and lying against said outer peripheral surface of said pivot shaft;
- said at least one seal comprising a holding portion encompassed by said structural material and a sealing portion lying against said pivot shaft;
- wherein one of the following applies:
- i) said bearing unit comprises at least one bearing ring made of said structural material, said holding portion of said at least one seal being encompassed by said structural material by insert-molding said holding portion in said structural material and, thereby, embedding said holding portion into the structural material of said at least one bearing ring;
- ii) said bearing unit comprises at least two bearing rings, said holding portion of said at least one seal being encompassed by said structural material by being held between said at least two bearing rings.

13. A method of manufacturing a butterfly valve, wherein said butterfly valve comprises:
- a butterfly valve housing defining a channel for accommodating a flow of gas therethrough;
- a butterfly valve adjustable in said butterfly valve housing between a closed position preventing said flow of gas through said channel and at least one open position opening up said channel for allowing passage of said flow of gas through said channel;
- a pivot shaft rotatable about a pivot shaft axis (A) and having first and second pivot shaft end portions corresponding to first and second bearing regions, said pivot shaft having an outer peripheral surface;
- said butterfly valve having a disk-shaped butterfly valve element supported on said pivot shaft;
- a pivot shaft drive;
- said first pivot shaft end portion being coupled to said pivot shaft drive and being rotatably supported about said pivot shaft axis (A) on said butterfly valve housing in said first bearing region;
- said second pivot shaft end portion being rotatably supported about said pivot shaft axis (A) on said butterfly valve housing in said second bearing region;
- at least one of said first and second bearing regions including a bearing unit made of structural material and rotatably supporting said pivot shaft and at least one seal supported in said bearing unit and lying against said outer peripheral surface of said pivot shaft, said at least one seal comprising a holding portion encompassed by said structural material and a sealing portion lying against said pivot shaft;
- wherein said method comprises encompassing said holding portion of said at least one seal by said structural material by one of:
- i) providing said bearing unit with at least one bearing ring made of said structural material and insert-molding said holding portion in said structural material and, thereby, embedding said holding portion into the structural material of said a least one bearing ring of said bearing unit;
- ii) providing said bearing unit with at least two bearing rings and positioning said holding portion of said at least one seal such as to be held between said at least two bearing rings of said bearing unit.

* * * * *